May 2, 1933.  E. GRANAT  1,906,905
RELAY FOR DISTANT CONTROL
Filed Nov. 23, 1931  2 Sheets-Sheet 1

E. Granat
INVENTOR

By: Marks & Clerk
Attys.

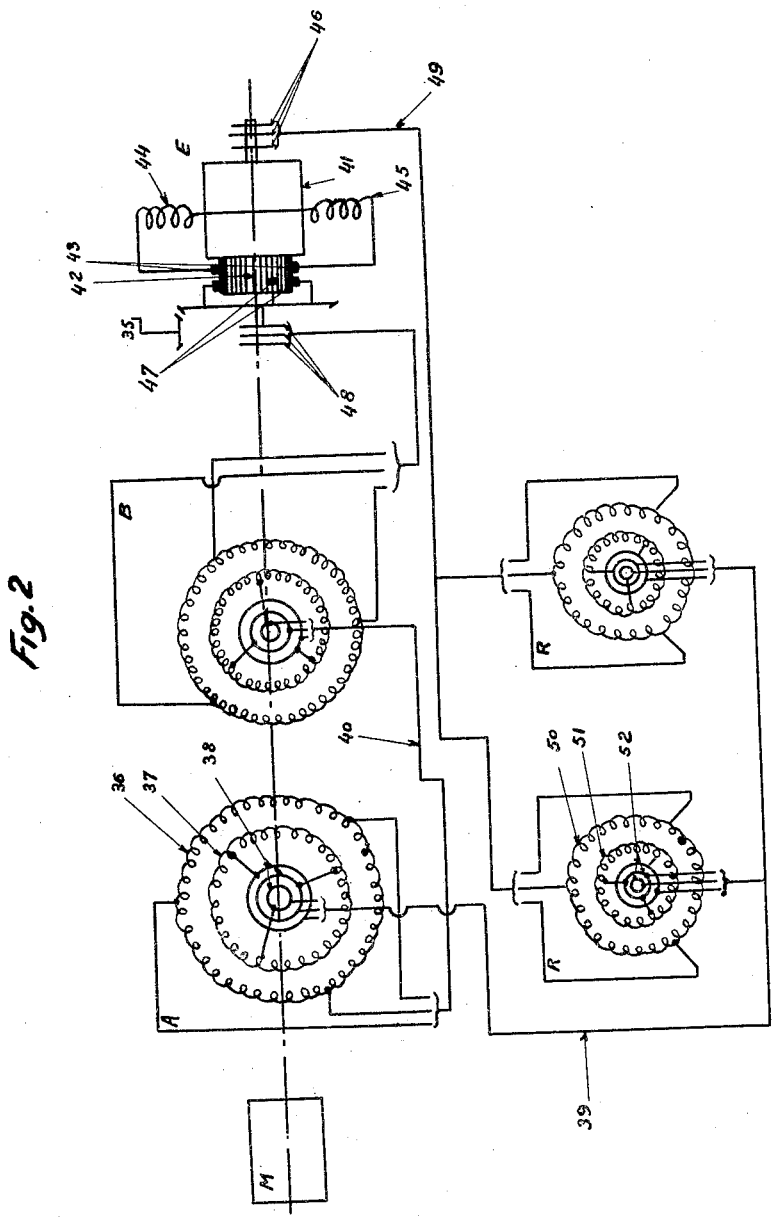

Patented May 2, 1933

1,906,905

UNITED STATES PATENT OFFICE

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE

RELAY FOR DISTANT CONTROL

Application filed November 23, 1931, Serial No. 576,865, and in France June 26, 1928.

My invention is a divisional continuation in part of that disclosed in my prior application Ser. No. 343,352.

My invention has for its object a distant control device affording means for a large power magnification of the type comprising a generator driven at a constant speed acting as the main transmitter and feeding the receivers with a current the frequency of which is variable, said generator being fed with an exciting current the frequency of which may be varied at will from its normal zero value. Distant control devices of this type have been disclosed heretofore only with commutator generators of any type. This shows the drawback, especially in the case of the use of sets of three sliding brushes or more, of causing considerable sparking. Moreover such commutators are costly and difficult to keep in proper working order and all the more so with the increased number of blades required for increased voltages. Furthermore the receivers of the devices of the above described type were heretofore of the synchronous motor type which obviously are not designed for the transmision of angular positions as the current passing therethrough when the rotor is stationary is normally intense and it is necessary to reduce its intensity through suitable contrivances.

Another inconvenience is due to the fact that each time the receiver rotor stars rotating the torque passes from zero to a comparatively high value.

My invention removes the above mentioned drawbacks and provides a distant control device using no commutator at the main transmitter or at the receivers and providing a substantially constant torque at the receivers without requiring at any time a large output of current. This is obtained by means of a generator comprising two windings without any commutator, said windings being connected through equidistant tappings respectively with the exciter and with one of the windings of each receiver of which the other winding is fed from any suitable supply with polyphase current having a constant frequency corresponding to that of the current fed by the generator when the frequency of the exciting current of the latter is zero.

To increase the power amplification I may dispose in series a plurality of generators the rotors of which may be all or in part keyed to the same shaft or controlled by the same motor, the current fed by one generator feeding the excitation of the next one, the last generator feeding the controlled receivers.

I have described hereinbelow merely by way of example and shown on appended drawings a form of execution of my invention.

Fig. 2 shows a similar distant control device comprising several generators in series.

Figure 1:
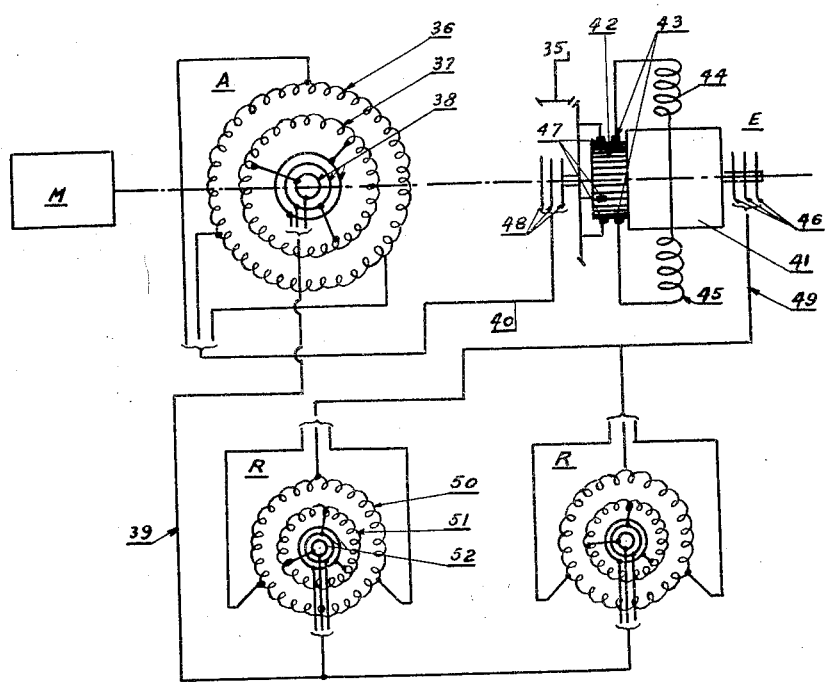
Fig. 1 is a diagram of the distant control device according to my invention fed with polyphase current, three-phase in the particular case described.

The device shown in Fig. 1 comprises the following parts:

A variable frequency alternator A acting as the main transmitter of the distant control, which alternator is driven by a motor M of any description having an adjustable constant speed.

It comprises the inducing field 36 provided with a distributed winding fed through three equidistant points by the wires 40 and the rotor 37 provided with a distributed winding connected through the rings 38 with the leads 39.

The field 36 of the main transmitter is fed by an exciter E acting as an auxiliary control transmitter and comprising a rotor 41 provided with a commutator 42 on which the stationary brushes 43 are adapted to rub with a view to feed the stationary field coils 44 and 45 inserted in shunt relation with reference to the rotor.

This direct current shunt exciter is provided with three rings 46 connected with three equidistant points of the rotor winding connected with the commutator or of a second independent rotor winding, said three rings feeding the leads 49.

A set of three movable brushes 47 is adapted to move over the commutator 42; these brushes connected with the wires 40 feeding the main transmitter through the rings 48 are controlled by the controlling part 35, a handwheel for instance.

The arrangement comprises moreover a certain number of controlled receivers such as R1, comprising a stator 50 and a rotor 51, both constituted by distributed windings and fed through three electrically equidistant points respectively by the leads 49 and 39. The feeding of the rotor by the leads 39 is provided through the three rings 52.

The working of the arrangement is as follows: The main transmitter A and the exciter E being driven at a constant speed by the motor M, a three-phase current of a constant frequency arises in both machines, the frequency being the same in both armatures if both machines have the same number of poles.

This requires that the main transmitter should have a stationary exciting field. Now the excitation is provided through the three movable brushes 47 rubbing on the commutator of the exciter E, excited in shunt by the two stationary brushes 43. Consequently as long as the brushes 47 are stationary the potentials at the rings 48 are constant and the inducing field of the transmitter A is stationary.

I will now call F the frequency of the current arising in the rotor of the main transmitter when its inducing field is stationary. When the set of movable brushes 47 is moved in the direction of rotation of the armature or in the opposite direction, the inducing field of the main transmitter A will rotate consequently with the same angular speed and in the same direction. Thereby the frequency of the current induced in the rotor of the main transmitter which depends on the relative speed of the rotor with reference to the field becomes $F+f$, $f$ being the frequency corresponding to the speed of rotation of the brushes 47. Thus the frequency of the alternator A is variable.

Each receiver rotor is fed with the variable frequency current from the transmitter A whilst the stators are fed directly through the rings 46 of the exciter E with three-phase current having a frequency F.

Thus, when the brushes 47 are stationary, the frequency of the transmitter A is equal to F and if the receivers R are suitably connected to three-phase currents passing through their rotor and their stator have the same frequency and produce two fields rotating at the same speed and in the same direction. The rotor is therefore stationary and is submitted to a synchronizing torque which urges it back into its position of equilibrium as soon as it moves out of it.

On the contrary, when the brushes 47 move over the commutator 42, the frequency in the rotor of the main transmitter becomes $F+f$ which causes the receiver rotor to rotate in a given direction with a speed corresponding to the frequency $f$, so as to provide the constant coincidence of the vectors of the two rotating fields.

It should be noted that in the example shown on Fig. 1, the exciter acts simultaneously as an auxiliary control transmitter. This system would work in the same manner if the excitation of the main transmitter were provided by an independent transmitter having any desired speed of rotation or by a static transmitter.

For obtaining different characteristic curves corresponding to the desired law between torque and speed I may act on the following variables: through the agency for instance of an automatic device rotating with the brushes 47.

(a) Excitation of the auxiliary transmitter E.

(b) Excitation of the main transmitter A through the insertion of resistances in the wires 40.

(c) Speed of rotation of the motor M.

(d) Excitation of the receivers R through the insertion of resistances in the leads 49.

The above disclosed adjustments will have as a consequence a modification in the energy transmitted to the rotor of each receiver.

Moreover the characteristic curve giving the relation between the torque and the speed of each reciver may be modified separately according to requirements by acting on the excitation of the receiver considered.

I may thus obtain at the receivers by using these adjusting means together, any desired law between the torque and the speed, this law depending both on the starting position of the controlled part and on the control speed required.

This method for transmission may be generalized as follows, as shown on Figure 2 showing a distant control with several transmitters in series.

The first main transmitter B feeds through its brushes the excitation coils of a more powerful transmitter A driven by the same motor M. This transmitter A may feed in its turn the excitation of a further transmitter driven by the same shaft and so on.

The number of poles of the exciter should be equal to or double that of the generators according as to whether the number of the latter is odd or even whereby a suitable connection between the successive generators causes them to feed alternatively frequencies F and 2F to the following generator.

I may thus provide a considerable energy at the output of the last transmitter, the currents acted upon at E remaining however very small.

What I claim is:

1. A polyphase distant control device comprising a generator, constituted by two windings each provided with a number of tappings corresponding to the number of phases used for the transmission, means for making one winding rotate with reference to the other with the desired angular velocity, a commutator exciter driven by last mentioned means feeding one generator winding through its tappings, receivers each constituted by two windings each provided with a number of tappings corresponding to the number of phases used in the transmission and adapted to rotate one with reference to the other, wires connecting the tappings of one winding of each receiver with those of the winding of the generator which is not fed from the exciter, a rotary part at the exciter adapted to shift the points of the exciter commutator through which the generator is fed and consequently to modify the frequency of the current fed by the generator and means for feeding the tappings of the second windings of the receivers with current having the same number of phases and the same frequency as that produced by the generator when the rotary part is stationary.

2. A polyphase distant control device comprising a generator constituted by two windings each provided with a number of tappings corresponding to the number of phases used for the transmission, means for making one winding rotate with reference to the other with the desired angular velocity, an exciter driven by last mentioned means including a field piece, a rotary armature winding provided with a number of tappings corresponding to the number of phases used, a commutator rigidly connected with the armature, stationary brushes rubbing on the commutator and means whereby the brushes feed the field piece of the exciter, a set of rotary brushes rubbing on the commutator of the exciter and feeding one generator winding through its tappings, receivers each constituted by two windings each provided with a number of tappings corresponding to the number of phases used in the transmission and adapted to rotate one with reference to the other, wires connecting the tappings of one winding of each receiver with those of the winding of the generator which is not fed from the exciter, a rotary part controlling the rotary brushes on the exciter commutator whereby the field arising in the first winding of the generator rotates correspondingly with reference to its winding and causes a corresponding modification in the frequencey of the current fed by the latter and means for feeding the tappings of the second windings of the receivers with polyphase current from the tappings on the exciter armature winding.

In testimony whereof I affixed my signature.

ELIE GRANAT.